United States Patent [19]
Ley et al.

[11] Patent Number: 6,039,548
[45] Date of Patent: Mar. 21, 2000

[54] FUEL PUMP WITH CONTROLLED VAPOR INTAKE

[75] Inventors: Wayne A. Ley, Middletown, Conn.; David E. Mroczka, Port Washington, N.Y.; Edward J. Talaski, Caro, Mich.

[73] Assignee: Walbro Corporation, Cass City, Mich.

[21] Appl. No.: 09/083,300

[22] Filed: May 22, 1998

[51] Int. Cl.[7] ............................. F04B 39/06; F02M 37/00
[52] U.S. Cl. ............................................. 417/313; 123/516
[58] Field of Search .................................... 417/313, 310; 137/590, 574, 576; 123/516, 509, 510

[56] References Cited

U.S. PATENT DOCUMENTS

| | | | |
|---|---|---|---|
| 4,538,958 | 9/1985 | Takei et al. ............................. | 415/55.5 |
| 4,697,995 | 10/1987 | Tuckey ..................................... | 418/15 |
| 5,070,849 | 12/1991 | Rich et al. ............................... | 123/509 |
| 5,089,975 | 2/1992 | Tuckey et al. .......................... | 123/509 |
| 5,122,039 | 6/1992 | Tuckey ..................................... | 417/366 |
| 5,192,184 | 3/1993 | Nobuo et al. ........................... | 415/169.1 |
| 5,452,701 | 9/1995 | Tuckey ..................................... | 123/509 |
| 5,456,235 | 10/1995 | Porter ....................................... | 123/509 |
| 5,486,087 | 1/1996 | Treiber et al. ........................... | 415/55.1 |
| 5,560,342 | 10/1996 | Fournier et al. ......................... | 123/509 |
| 5,586,858 | 12/1996 | Tuckey ..................................... | 415/551 |
| 5,718,208 | 2/1998 | Brautigan et al. ....................... | 123/516 |
| 5,787,865 | 8/1998 | Harris et al. ............................. | 123/516 |

*Primary Examiner*—Charles G. Freay
*Assistant Examiner*—Robert Z. Evora
*Attorney, Agent, or Firm*—Reising, Ethington, Barnes, Kisselle, Learman & McCulloch, P.C.

[57] ABSTRACT

A fuel pump module with an inlet fuel filter has a vapor inlet in communication with the interior of the filter and constructed to reduce the size of larger vapor bubbles trapped within the filter before they are ingested by the fuel pump downstream of the filter to limit the amount of fuel vapor ingested by the fuel pump at one time. Preferably, a tubular inlet sleeve is integrally connected with the fuel filter and press fit onto the inlet of the fuel pump as a subassembly with the vapor inlet passage formed in the inlet sleeve. The vapor inlet passage may be a slot formed in the inlet sleeve providing a reduced area flow path through which vapor in the interior of the filter may pass before entering the fuel pump.

13 Claims, 2 Drawing Sheets

FUEL PUMP WITH CONTROLLED VAPOR INTAKE

FIELD OF THE INVENTION

This invention relates to fuel pumps and more particularly to a fuel pump adapted to control the ingestion of fuel vapor by the fuel pump.

BACKGROUND OF THE INVENTION

Electric motor fuel pumps mounted within a vehicle fuel tank have been used to supply fuel under pressure to the vehicle engine. Ingestion of fuel vapors by the fuel pump reduces the efficiency of the fuel pump and in extreme cases, can cause vapor lock or other operational problems. Especially with turbine vane fuel pumps, it is important to limit the vapor intake of the fuel pump because these fuel pumps do not sufficiently purge themselves of vapor under adverse temperature or other vapor generating conditions.

Some fuel pumps utilize a bag shaped filter which defines an enclosure through which fuel is drawn into the inlet of the fuel pump. During use of the fuel pump, some of the vapor drawn into the enclosure of the filter may separate from the liquid fuel and collect adjacent the upper wall of the filter forming a large volume of vapor bubbles. While some current fuel pumps can sufficiently process small amounts of vapor, it is undesirable to draw a large amount of vapor into the fuel pump due to the decrease in efficiency of the fuel pump as well as the potential for vapor lock or other adverse affects.

SUMMARY OF THE INVENTION

A fuel pump with a fuel inlet filter and a vapor inlet passage formed in communication with the interior of the filter and constructed to reduce the size of larger vapor bubbles trapped within the filter before they are ingested by the fuel pump to limit the amount of fuel vapor ingested by the fuel pump at one time. Preferably, a tubular inlet sleeve is integrally connected with the fuel filter and press fit onto the inlet of the fuel pump as a subassembly with the vapor inlet passage formed in the inlet sleeve. The vapor inlet passage may be a slot formed in the inlet sleeve providing a reduced area flow path through which vapor in the interior of the filter may pass before entering the fuel pump.

The filter preferably has an upper wall and a lower wall which define an enclosure into which fuel is drawn before being ingested by the fuel pump. In use, some of the fuel vapor drawn into the enclosure bubbles or separates from the liquid fuel and collects adjacent the upper wall of the filter forming a large vapor dome. Due to its gaseous nature, the fuel vapor remains adjacent the upper wall of the filter. The inlet sleeve preferably extends below the upper wall of the filter and channels a large portion of the intake fuel flow from adjacent the lower wall of the filter. The vapor inlet passage formed in the inlet sleeve provides the only direct flow path into the fuel pump adjacent the upper wall of the filter. Thus, the vapor bubbles when drawn into the fuel pump, flow through the vapor inlet passage which has a reduced flow area sized to limit the rate at which vapor flows into the pump inlet. The vapor inlet passage also breaks up large vapor bubbles into a plurality of smaller bubbles which can be more easily processed by the fuel pump.

Objects, features and advantages of this invention, include providing a fuel pump which is adapted to control the amount of fuel vapor drawn into the fuel pump at any one time, eliminates the ingestion of large vapor bubbles into the fuel pump, permits controlled ingestion of fuel vapor trapped within the fuel filter, increases the efficiency of the fuel pump, substantially prevents vapor lock within the fuel pump and is of relatively simple design, economical manufacture and assembly and has a long in-service useful life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
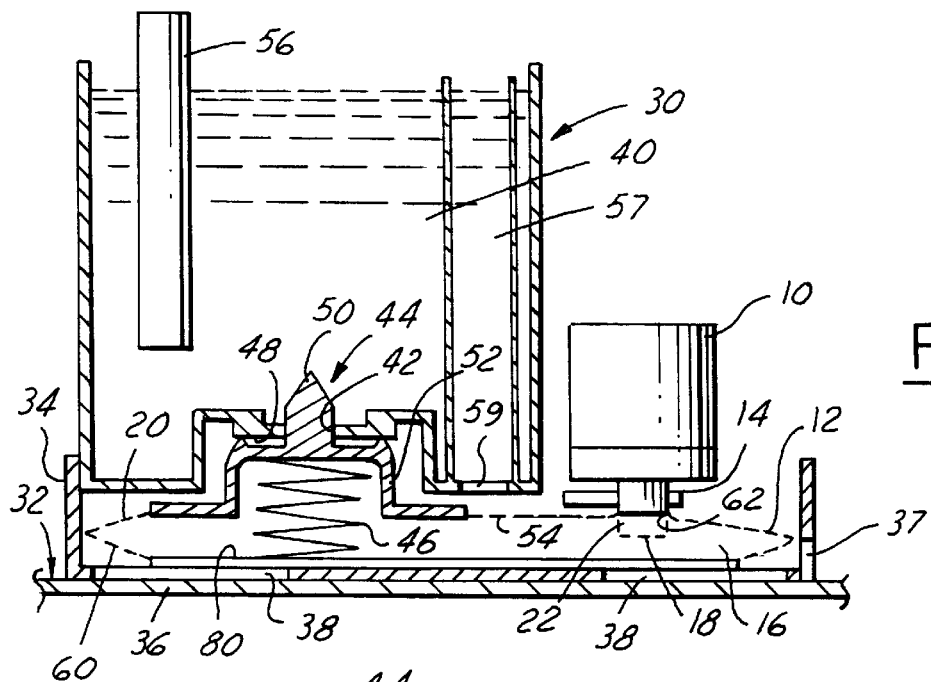
FIG. 1 is a semi-diagrammatical view of a fuel pump disposed within a fuel tank and embodying this invention.

Referring in more detail to the drawings, FIG. 1 illustrates a fuel pump 10 having a bag shaped filter 12 connected to the fuel pump inlet 14 and defining an enclosure 16 into which fuel is drawn before being drawn into the fuel pump 10 to be delivered under pressure to an operating engine. A vapor inlet passage 18 is provided adjacent an upper wall 20 of the filter 12 and is preferably formed within a tubular inlet sleeve 22 telescopically received adjacent the fuel pump inlet 14. The inlet sleeve 22 is preferably generally circumferentially continuous and extends axially downwardly from the upper wall 20 of the filter 12 such that fuel vapor and any large fuel vapor bubbles 24 adjacent the upper wall 20 of the filter 12 pass through the vapor inlet passage 18 before being drawn into the fuel pump 10. The vapor inlet passage 18 is sized to break up large vapor bubbles 24 into a plurality of smaller vapor bubbles 26 which are more easily processed by the fuel pump 10 without operational problems such as vapor lock or significantly diminished fuel pump efficiency associated with the ingestion of large amounts of vapor at one time.

The fuel pump 10 is preferably carried by a fuel pump module 30 disposed within a vehicle fuel tank 32 preferably with the fuel pump inlet 14 generally adjacent the lowest portion of the fuel tank 32. Preferably, a base portion 34 of the fuel pump module 30 rests on the lower fuel tank wall and has a plurality of openings 37 and 38 through which fuel is drawn by the fuel pump 10 into the module 30 from the fuel tank 32. The fuel pump 10 may be either a positive displacement type pump such as the gear rotor pump disclosed in U.S. Pat. No. 5,122,039 or a turbine vane fuel pump such as the pump disclosed in U.S. Pat. No. 5,586,858 the disclosures of which are incorporated herein by reference and hence, the fuel pump will not be described in greater detail. Preferably the fuel pump is capable of supplying the total fuel demand of the vehicle engine.

The fuel pump module 30 may define a reserve fuel reservoir 40 having an outlet 42 selectively communicated with the fuel pump inlet 14 by a valve 44 yieldably biased by a spring 46 to bear on a valve seat 48 and prevent the flow of fuel from the reservoir 40 to the fuel pump inlet 14. The valve 44 is displaceable from the valve seat 48 to allow fuel within the reservoir 40 to flow to the fuel pump inlet 14 when fuel is absent from the fuel pump inlet 14 such that the negative pressure created by the fuel pump 10 displaces the valve 44 and opens the outlet 42. Preferably, as shown in FIG. 1, the valve 44 comprises a valve head 50 which projects through the outlet 42 to close it and a valve body 52 carried by the filter upper wall 20 and preferably embedment molded with or heat sealed to the filter 12. The valve 44 is preferably carried in a flexible bellows-like portion 54 of the filter upper wall 20 which is displaceable to enable displacement of the valve 44.

Excess fuel returned from the engine fuel rail is discharged into the reservoir 40 through the return pipe 56. When the levels of fuel in the main tank 32 rises above the open upper end of the reservoir, such as during refueling of the tank, fuel from the tank also flows into and fills the reservoir 40. Preferably, a stand pipe 57 is disposed in the reservoir 40 communicating with the fuel pump inlet 14 through an opening 59 in the reservoir 40 and the filter 12. When the level of fuel in the reservoir 40 reaches the open upper end of the stand pipe 57, the return fuel in the reservoir 40 flows through the stand pipe 59 to be drawn into the fuel pump 10. This prevents the return fuel, which has been heated upon passing through the fuel rail, from overflowing the reservoir 40 and being discharged into the colder fuel in the tank 32 which would generate a significant amount of fuel vapor. Also, it is desirable to draw the return fuel into the pump 10 because the return fuel has already been filtered at least once upon originally passing through the filter 12 and into the pump 10.

Figure 2:
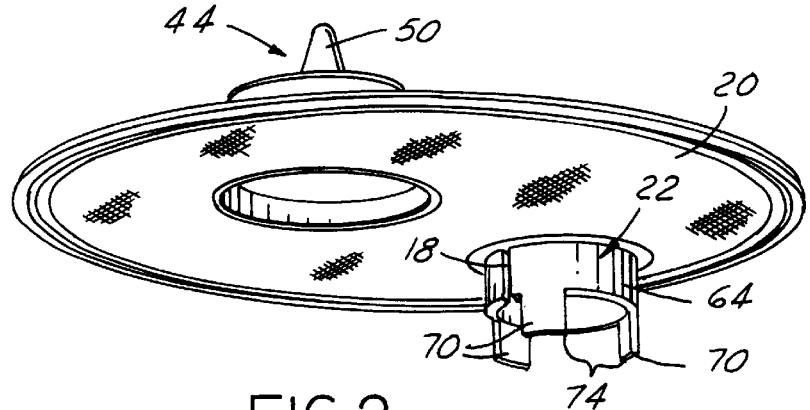
FIG. 2 is a perspective view of the upper wall of the fuel filter.
Figure 3:
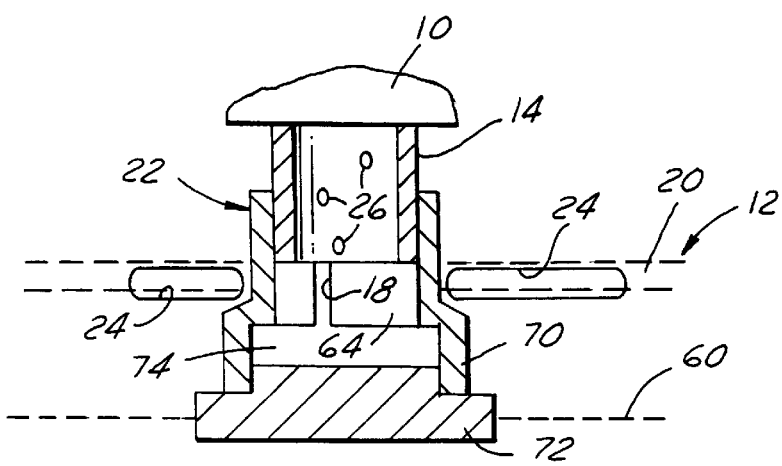
FIG. 3 is a broken sectional view illustrating the inlet sleeve and vapor inlet passage received adjacent the fuel pump inlet.

The fuel filter 12 preferably comprises the upper wall 20 and a lower wall 60 each comprising an annular sheet of porous material joined together about their peripheries such as by a heat seal to define the enclosure 16. As shown in FIGS. 2 and 3, the inlet sleeve 22 is received through an opening 62 in the filter upper wall 20 and is integrally joined with the filter upper wall 20 preferably by a heat seal about the exterior of the inlet sleeve 22. The vapor inlet passage 18 is preferably an axially extending slot formed through the side wall 64 of the inlet sleeve 22 within the enclosure 16 of the fuel filter 12. The vapor inlet passage 18 provides a reduced area flow path from adjacent the filter upper wall 20, through the inlet sleeve 22 and into the fuel pump 10.

The inlet sleeve 22 may have a plurality of depending feet 70 constructed to engage either the filter lower wall 60 or a spacer disk 72 adjacent the filter lower wall 60. This maintains the filter upper wall 20 separate from the filter lower wall 60 at least adjacent the fuel pump inlet 14 even when fuel is absent adjacent the fuel pump inlet 14 and the capillary action of the liquid in the wet fuel filter 12 prevents the passage of air therethrough and the pressure drop created by the operating pump 10 tends to draw the filter lower wall 60 toward the filter upper wall 20 and the fuel pump inlet 14. This permits the negative pressure created by the fuel pump 10 to be communicated with the valve 44 normally closing the outlet 42 of the reserve fuel reservoir 40 to displace and open the valve 44 and permit fuel in the reservoir 40 to flow to the fuel pump 10. To achieve this liquid capillary seal, the filter walls have an average or nominal pore size of about between 20 microns to 40 microns. Further, the gaps 74 between the feet 70 and the lower edge of the side wall 64 of the inlet sleeve 22 provide a flow path through which liquid fuel may freely enter the fuel pump inlet 14 after being drawn into the fuel filter enclosure 16. Optionally, as best seen in FIG. 1, the filter lower wall 60 may have an annular perforate disk 80 integral therewith and engageable by either the spring 46 biasing the valve 44 or the feet 70 of the inlet sleeve 22 or both, to maintain the filter lower wall 60 separate from the filter upper wall 20 and thereby permit displacement and opening of the valve 44 adjacent the outlet 42 of the reserve fuel reservoir 40.

Figure 4:
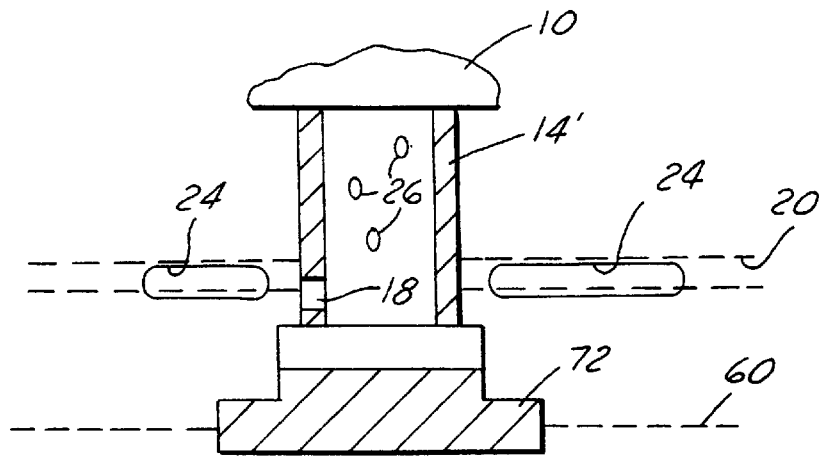
FIG. 4 is a broken sectional view illustrating another embodiment of the present invention wherein the vapor inlet passage is formed in the fuel pump inlet.

More than one vapor inlet passage 18 may be provided in the side wall 64 of the inlet sleeve 22, with each passage or slot 18 circumferentially spaced about the side wall 64. In another form, the vapor inlet passage 18 can comprise one or more small through holes in the side wall 64 of the inlet sleeve 22 and adjacent the filter upper wall 20. In still another form, as shown in FIG. 4, the vapor inlet passage 18 is formed directly in a portion of fuel pump inlet 14' which extends into the fuel filter enclosure 16 with the filter upper wall 20 sealed about the exterior of the fuel pump inlet 14' such as by a heat seal.

Figure 5:
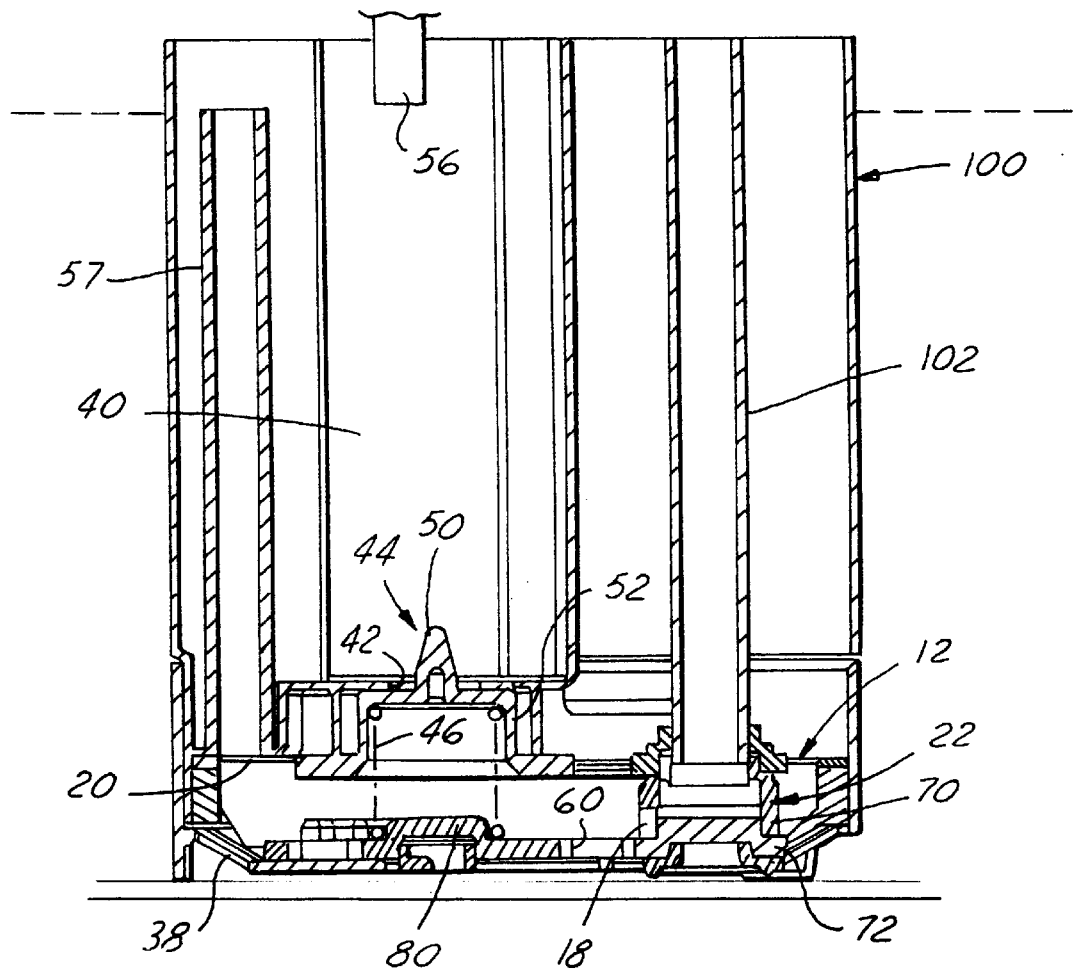
FIG. 5 is a sectional view of a module such as may be used in a diesel fuel system with an inlet sleeve and vapor inlet passage on a fuel supply tube of the module according to the invention.

In another embodiment, as shown in FIG. 5, a fuel supply module 100, such as may be used in a diesel fuel system has a supply tube 102 telescopically received in the inlet sleeve 22 having the vapor inlet passage 18. A remote fuel pump draws fuel through the filter 12, the inlet sleeve 22 and through the supply tube 102 to supply the diesel fuel to the vehicle engine. This embodiment is constructed and operates in substantially the same manner as the previous embodiment, with the exception that a fuel pump is not received in the module 100, and hence, its operation and structure will not be further described.

OPERATION

In use, fuel from the surrounding fuel tank 32 is drawn into the fuel pump module 30 and into the fuel filter enclosure 16 by the negative pressure created by the operating fuel pump 10. As the fuel passes through the fuel filter 12 or is otherwise agitated, heated or subjected to changing temperatures or pressures, a portion of the fuel may vaporize. During use, some of the fuel vapor within the enclosure 16 forms bubbles in or separates from the liquid fuel and collects adjacent the filter upper wall 20, (the capillary action of the liquid in the wet filter prevents the fuel vapor from passing therethrough) forming large vapor bubbles or a vapor dome. The inlet sleeve 22 or pump inlet 14' which extends into the fuel filter enclosure 16 prevents these large vapor bubbles from being drawn directly into the fuel pump 10 and forces the large vapor bubbles to be drawn through the vapor inlet passage 18. When drawn through the reduced flow area of the vapor inlet passage 18 the large fuel vapor bubbles are broken or divided into a plurality of smaller bubbles dispersed or entrained within the liquid fuel drawn into the fuel pump 10 to prevent an excessive amount of fuel vapor from being drawn into the fuel pump 10 at one time which would adversely affect the performance of the fuel pump 10.

In use pressurized fuel is supplied from the outlet of the pump 10 to the fuel rail and fuel injectors of a vehicle internal combustion engine and excess fuel is returned to the reservoir 40 through the return pipe 56. Under prolonged periods of engine idling or other low fuel demand conditions, sufficient excess fuel may be returned to the reservoir 40 to substantially completely fill it until the fuel level in the reservoir reaches the open upper end of the stand pipe 57 whereupon the return fuel flows through the stand pipe 57 and the filter 12 so that it may be drawn into the fuel pump 10.

We claim:

1. A fuel pump module to be disposed within a fuel tank comprising:

a fuel pump having an inlet through which fuel is drawn into the fuel pump and an outlet through which fuel is delivered under pressure;

a filter disposed adjacent to the bottom of the tank and having an upper wall and a lower wall defining an enclosure communicating with the fuel pump inlet for drawing fuel from the tank through the filter and into the fuel pump inlet;

at least one vapor inlet within the enclosure disposed above and communicating with the fuel pump inlet, and having a smaller flow area than the fuel pump inlet flow area whereby large fuel vapor bubbles within the enclosure adjacent the filter upper wall are divided into smaller vapor bubbles upon passing through the vapor inlet to reduce and limit the maximum amount of fuel vapor drawn into the fuel pump at one time.

2. The fuel pump of claim 1 wherein the inlet is a tubular body communicating at one end with the enclosure and each vapor inlet is a slot formed in the inlet and within the enclosure.

3. The fuel pump of claim 1 which also comprises a tubular inlet sleeve received in telescopic relation with the inlet and extending into the enclosure and each vapor inlet is formed in the inlet sleeve and within the enclosure.

4. The fuel pump of claim 3 wherein the inlet sleeve is integrally connected with the filter.

5. The fuel pump of claim 4 wherein the filter upper wall and filter lower wall are separate layers of filter material sealed about their peripheries and the inlet sleeve is connected with the filter upper wall.

6. The fuel pump of claim 3 wherein the inlet sleeve is generally circumferentially continuous adjacent the filter upper wall with each vapor inlet formed in the inlet sleeve adjacent the filter upper wall whereby each vapor inlet provides a direct path to the fuel pump adjacent the filter upper wall such that the fuel vapor adjacent the filter upper wall is drawn through the vapor inlet before being drawn into the fuel pump.

7. The fuel pump of claim 5 wherein the filter upper wall is heat sealed to the inlet sleeve.

8. The fuel pump of claim 3 wherein the inlet sleeve extends through the enclosure and is engageable with the filter lower wall to maintain at least a portion of the filter lower wall separate from the filter upper wall.

9. The fuel pump of claim 8 wherein the inlet sleeve has a plurality of feet extending therefrom and engageable with the filter lower wall providing a flow passage between adjacent feet through which liquid fuel in the enclosure can flow to the fuel pump inlet even when the filter lower wall engages the feet.

10. The fuel pump of claim 1 wherein the inlet is a tubular body extending into the enclosure and each vapor inlet is a generally circular opening formed in the inlet and within the enclosure.

11. The fuel pump of claim 5 wherein each vapor inlet is an axially extending slot formed in the inlet sleeve and extending towards the bottom wall from adjacent the upper wall.

12. The fuel pump of claim 5 wherein each vapor inlet is a generally circular opening formed in the inlet sleeve generally adjacent the filter upper wall.

13. A fuel module constructed to be disposed within a fuel tank comprising:

a fuel supply passage having an inlet adjacent the bottom of the tank through which fuel is drawn;

a filter disposed adjacent to the bottom of the tank and having an upper wall and a lower wall defining an enclosure communicating with the fuel supply passage inlet for drawing fuel through the filter and into the fuel supply passage;

at least one vapor inlet within the enclosure and disposed above and communicating with the fuel supply passage inlet and having a smaller flow area than the fuel supply passage inlet flow area whereby large fuel vapor bubbles within the enclosure adjacent the filter upper wall are divided into smaller vapor bubbles upon passing through the vapor inlet to reduce and limit the maximum amount of fuel vapor drawn into the fuel supply passage at one time.

* * * * *